United States Patent

[11] 3,619,397

| [72] | Inventor | Jean-Claude Jacquemet |
| | | Lyon, France |
| [21] | Appl. No. | 877,050 |
| [22] | Filed | Nov. 14, 1969 |
| [45] | Patented | Nov. 9, 1971 |
| [73] | Assignee | Rhone-Poulenc S. A. |
| | | Paris, France |
| [32] | Priority | Nov. 14, 1968 |
| [33] | | France |
| [31] | | 173,743 |

[54] PROCESS FOR THE PURIFICATION OF LACTIC ACID
7 Claims, No Drawings

| [52] | U.S. Cl. | 204/180 P |
| [51] | Int. Cl. | B01d 13/02 |
| [50] | Field of Search | 204/180 P, 301, 128, 130; 99/57 |

[56] References Cited
UNITED STATES PATENTS

| 2,631,100 | 3/1953 | Aten et al. | 99/57 |
| 2,758,965 | 8/1956 | Block et al. | 204/180 P |
| 3,166,486 | 1/1965 | Hull | 204/180 P |
| 3,447,930 | 6/1969 | Francis | 99/57 |

*Primary Examiner*—John H. Mack
*Assistant Examiner*—A. C. Prescott
*Attorney*—Stevens, Davis, Miller & Mosher

ABSTRACT: Lactic acid obtained by fermentation of carbohydrates is purified by electrodialkysis followed by extraction with an organic solvent immiscible with water.

PROCESS FOR THE PURIFICATION OF LACTIC ACID

The present invention provides a process for the purification of lactic acid obtained by fermentation.

Lactic acid obtained by usual fermentation processes exhibits a disagreeable odor and taste which make it unsuitable for foodstuff and pharmaceutical uses. In order to avoid these disadvantages it has been proposed to use particularly pure carbohydrates such as refined sugar as the starting material for the fermentation. Since such a process is expensive, various methods of purification of lactic acid obtained by usual fermentation processes have been proposed. In the majority of cases these consist of extracting the lactic acid with one or more organic solvents and then recovering it by washing the organic solutions with water. In these processes the most extensively used solvent is isobutyl ether (see U.S. Pat. No. 1,906,068). Despite the improvement which they bring about, these processes have not afforded a completely satisfactory solution to the problem of reducing the flavour and odor of lactic acid intended for use in foodstuffs and pharmaceuticals.

According to the present invention, there is provided a process for the purification of lactic acid obtained by fermentation of carbohydrates, which enables the said acid to be obtained devoid of disagreeable flavour and odor and which comprises (a) introducing the crude lactic acid, in aqueous solution containing 1 to 80 percent by weight of lactic acid, preferably 1 to 20 percent by weight, into a dilution compartment, while introducing water or an aqueous solution of an acid into a concentration compartment, of an electrodialysis cell; and removing from the concentration compartment an aqueous solution containing purified lactic acid; and (b) extracting the purified lactic acid with an organic solvent immiscible with water. It is also possible to further extract the organic solution obtained from stage (b) with water.

The process of the present invention may be practiced using a cell comprising only one of each type of compartment; but in practice, a plurality of each type of compartment is used.

The apparatus and membranes used for carrying out the process of the invention are those usually employed in electrodialysis. Such apparatus has been described in the work by R. N. Rickles: "Membranes Technology and Economics."

In accordance with terminology used in the art, the term "dilution compartment" of the cell is hereafter used to describe the compartment into which the aqueous solution of crude lactic acid is fed. Likewise, the term "concentration compartment" is used to describe the compartment in which the purified lactic acid is collected. The streams issuing from the dilution compartment and concentration compartment are called the "dilution stream" and "concentration stream," respectively.

The electrodialysis cell comprises two electrode compartments separated by one or more dilution compartments and one or more concentration compartments. Each such compartment is separated from the next by an anionic membrane and a cationic ion-exchange membrane.

Preferably, the compartments between the anode and cathode compartments are an alternating series of concentration and dilution compartments with the ion-exchange membrane separating them being an alternating series of anionic and cationic membranes. Preferably, the compartment adjoining the cathode compartment is a dilution compartment while that adjoining the anode compartment is a concentration compartment, in which case the ion-exchange membrane separating the anode from the adjacent concentration compartment and also the cathode from the adjacent dilution compartment is, in both cases, a cationic membrane. This is because the presence of an anionic membrane between the anode compartment and the adjacent concentration compartment results in a loss of lactic acid through the passage of lactate ions into the anode compartment; also, the presence of an anionic membrane between the cathode compartment and the adjacent dilution compartment favours the passage of the anions present in the catholyte into the adjacent compartment.

The membranes used in the process of the invention are those obtained from usual ion-exchange polymers such as those mentioned in the work "Encyclopedia of Polymer Science and Technology," Volume 7, pages 692 to 708. For example, membranes based on sulphonated styrene-divinylbenzene copolymers may be used as the cationic membranes and membranes based on chloromethylated and quaternized styrene-divinylbenzene copolymers may be used as the anionic membranes.

Each electrode compartment is fed with an aqueous solution of an electrolyte. Though the latter can be chosen from among the salts of inorganic or organic acids of from strongly dissociated bases, it is preferable to employ acids and in particular inorganic acids such as hydrochloric, sulphuric, phosphoric or nitric acids. The electrolyte concentration of the solutions introduced into the electrode compartments is not a critical factor in the process of the invention.

The concentration compartments are supplied initially with an aqueous stream of pure water or, in order to lower the electrical resistance of the cell, an aqueous solution of an electrolyte, preferably an aqueous solution of lactic acid. Either an aqueous solution of the crude lactic acid or the concentration stream of a previous electrodialysis operation, and adjusted to an adequate lactic acid content, may be used as the feed for the dilution compartments. This lactic acid content may range from 1 to 80 percent by weight. It is, however, preferred to use a concentration from 1 to 20 percent by weight since excessive concentrations of lactic acid inhibit its dissociation and, as a result, increase the electrical resistance of the cell.

The crude lactic acid is fed into the dilution compartments as an aqueous solution obtained after decomposing an alkaline earth lactate coming from the carbohydrate fermentation zone by means of a strong acid.

The aqueous solution of crude lactic acid may be concentrated before electrodialysis. However, for the reasons already indicated above, it is preferable to employ solutions of which the concentration is less than 20 percent.

It has been found that, depending on the electrodialysis conditions, a partial transport of water from the dilution compartments into the concentration compartments may occur, and this simple dialysis contributes to an increase in the concentration or organic species including lactic acid, in the dilution stream. It is thus important to keep the amount of water present in the dilution stream essentially constant by adding to this stream an amount of water essentially equal to that transported with the lactic acid. It is however possible to restrict the transport of water by choosing membranes of suitable porosity.

The current density employed is not critical an may vary within wide limits. Thus it may be varied between 5 and 200 mA/cm.$^2$ and preferably between 10 and 100 mA/cm.$^2$.

In each electrodialyser the concentration stream and the dilution stream may be fed in parallel into the corresponding compartments or may be passed successively through all the compartments of each type. In this latter case, the dilution and concentration streams may travel in the same direction or in opposite directions in the apparatus.

Regardless of the type of circulation employed, the dilution stream and the concentration stream may be recycled by a pump into the same electrodialyser for a period which suffices for completing the treatment. It is also possible to pass the dilution and concentration streams into one or more other electrodialysers arranged in series.

Thus it is possible to pass the dilution stream issuing from one electrodialyser into the dilution compartments of another electrodialyser in which the concentration compartments may be fed either with a solution of pure lactic acid or with the concentration streams issuing from the preceding electrodialyser or electrodialysers.

Depending on the amount of crude lactic acid to be treated, it is possible to use one or more parallel devices comprising one or more electrodialysers combined as stated above.

The aqueous solution of lactic acid which forms the concentration stream may be extracted directly with organic solvents or may be concentrated beforehand so as to bring its lactic acid content to a value most amenable to the solvent used for the extraction.

The extraction solvents are those previously known in the art for purifying lactic acid obtained by fermentation: for example, alcohols, ketones, ethers, or their mixtures. Combinations of organic solvents and mineral acids may also be used, such as those forming the subject of U.S. Pat. No. 2,710,880, for example, a mixture of isopropyl alcohol or of methyl ethyl ketone and ammonium sulphate. The preferred solvent is diisopropyl ether.

The extraction techniques are those usually employed and more particularly counter-current extraction.

The lactic acid present in the organic solution coming from the extraction zone may be recovered in manner known per se. A particularly advantageous method consists in extracting the lactic acid from the organic solution with water. An aqueous solution of practically colorless lactic acid having a flavour and odor appropriate for use in foodstuffs and pharmaceuticals is thus obtained.

Though the process according to the invention is particularly suited to continuous operation it may also be used as a batch process.

The following example illustrates the invention.

EXAMPLE

The electrodialyser used comprised two electrode compartments, 10 concentration compartments, 10 dilution compartments, 10 anionic membranes and 11 cationic membranes. The anode compartment was separated from the adjacent concentration compartment by a cationic membrane. The cathode compartment was also separated from the adjacent dilution compartment by a cationic membrane, and the other compartments were alternately separated by anionic and cationic membranes. The anionic membranes used were based on a chloromethylated and quaternized styrene/divinylbenzene copolymer reinforced by a woven fabric of an acrylonitrile/polyvinyl chloride copolymer and sold commercially under the registered Trade Mark "NEPTON," and were of quality 111 BZL 219. The cationic membranes used were based on a sulphonated styrene/divinylbenzene copolymer reinforced by a woven fabric of an acrylonitrile/polyvinyl chloride copolymer and sold commercially under the name "NEPTON," and were of quality 61 AZL 183.

Each membrane was rectangular, its dimensions being 25 cm. ×22.5 cm. × 0.06 cm. Each membrane was separated from the next membrane by an interposed foil of polyethylene in which a series of zigzags was perforated which defined a liquid flow path 0.6 cm. wide and 367 cm. long between two successive membranes. The useful surface area of each membrane was thus reduced to 220 cm.$^2$. The interposed foil was of the same external dimensions as the membranes and was 1 mm. thick.

The anode consisted of a platinized tantalum plate and the cathode of a stainless steel plate of the same size as the membranes.

The electrodialyser also comprised three reservoirs: the first contained a 1 percent strength aqueous solution of sulphuric acid which formed the electrolyte of the electrode compartments, the second contained 4 litres of a 12 percent strength by weight aqueous solution of pure lactic acid forming the concentration stream and the third contained 4 litres of a 13.1 percent strength solution of crude lactic acid exhibiting a very pronounced fermentation odor *sui generis* and a disagreeable flavor.

Three pumps recycled the various solutions into the compartments of the cell. The electrolyte stream was recycled between each electrode compartment and the corresponding reservoir at a flow rate of 22.1./hour. The concentration solution and the crude acid solution were recycled between their respective reservoirs and each of the concentration and dilution compartments at a flow rate of 7 l./hour.

When the various streams were circulating in the electrodialyser, an electrical current of 6 amperes, was passed between the electrodes. After 2 hours 30 minutes under these conditions the dilution stream, to which 3,200 cm.$^3$ of water had been added during the operation in order to keep its volume constant, contained not more than 1 percent of lactic acid; 93 percent of the lactic acid present in the dilution stream had been transferred into the concentration stream. The latter consisted of 7.2 litres of a 13.3 percent strength by weight aqueous solution of lactic acid, which was seven times less colored than the crude acid solution.

The aqueous solution thus obtained was concentrated by distillation at 50° C. under a pressure of 50 mm. Hg, until 83 percent strength by weight lactic acid was obtained.

130 cm.$^3$ of concentrated lactic acid were introduced into a decanter and extracted 25 times with 130 cm.$^3$ of isopropyl ether saturated with water. Between each addition of ether, the contents of the decanter were agitated, the aqueous and organic phases were then allowed to separate, and the latter was separated. The final organic solution of lactic acid was thereafter extracted with 100 cm.$^3$ of water in 10 cm.$^3$ fractions in accordance with the same technique as above. The aqueous solution thus obtained was concentrated to a lactic acid content of 80 percent. The product obtained is practically colorless and of very slight odor and flavor, making it suitable for use in foodstuffs and pharmaceuticals.

The product obtained gave the following analysis:

| | | |
|---|---|---|
| free acidity | 78.58%) | |
| bonded acidity | 3.24%) | expressed as lactic acid |
| total acidity | 81.82%) | |
| lactic acid | | 75.35% |
| lactyl-lactic acid | | 5.84% |
| chloride (as Cl") | | 0.00075% |
| sulphate (as SO$_4$") | | 0.0025% |
| heavy metals | | negative reaction |
| iron | | 0.00005% |
| sulphate ash | | 0.0258% |
| reducing sugars | | zero, according to the test |
| carbonizable organic substances | | zero, according to the test. |

The analyses were carried out in accordance with the French Codex of 1965. The percentages are expressed by weight.

I claim:

1. A process for the purification of lactic acid obtained by fermentation of carbohydrates which comprises (a) introducing the crude lactic acid, in aqueous solution containing 1 to 80 percent by weight of lactic acid into a dilution compartment, while introducing water or an aqueous solution of an acid into a concentration compartment, of an electrodialysis cell; and removing from the concentration compartment an aqueous solution containing purified lactic acid; and (b) extracting the purified lactic acid from the said solution with an organic solvent immiscible with water.

2. The process according to claim 1 in which the lactic acid is further extracted from the organic solution obtained from stage (b) with water.

3. The process according to claim 1 in which the solution of pure lactic acid is recycled into the dilution compartment.

4. The process according to claim 1 in which the electrodialysis cell comprises a cathode compartment, an anode compartment and between them an alternating series of concentration and dilution compartments, with the compartment adjoining the cathode compartment being a dilution compartment and the compartment adjoining the anode being a concentration compartment, each compartment being separated from the next by an ion-exchange membrane, there being alternately a cationic and an anionic membrane with the membrane separating the cathode compartment from the adjacent dilution compartment being a cationic membrane.

5. The process according to claim 1 in which the lactic acid is introduced in an aqueous solution containing from 1 percent to 20 percent by weight of lactic acid.

6. The process according to claim 1 in which the concentration compartments are fed with an aqueous solution of pure lactic acid.

7. The process according to claim 1 in which the organic solvent used to extract the lactic acid from the concentration stream issuing from the electrodialyser is diisopropyl ether saturated with water.